Patented Jan. 17, 1939

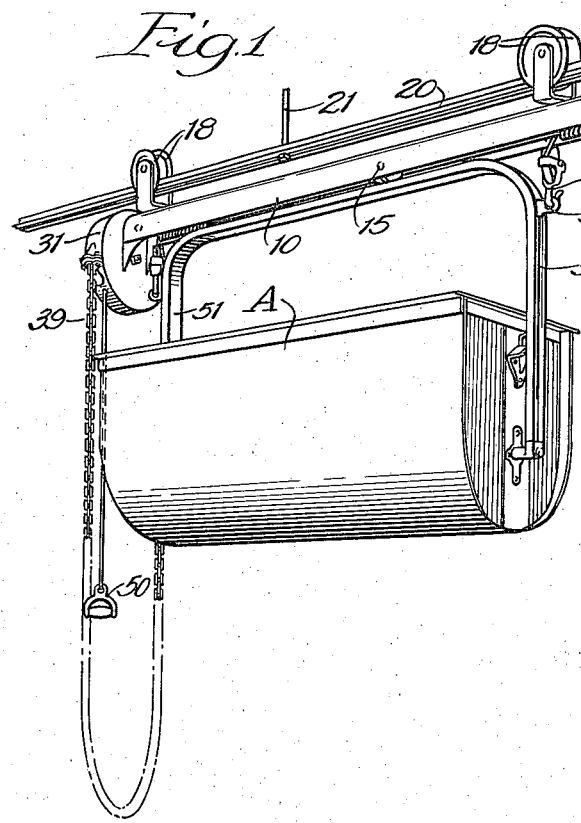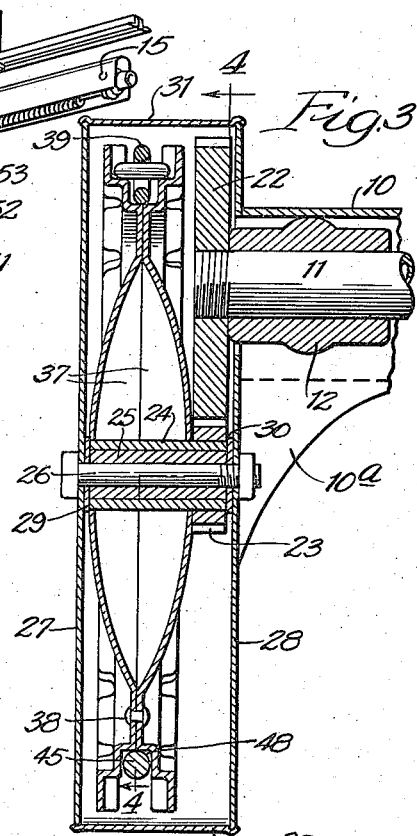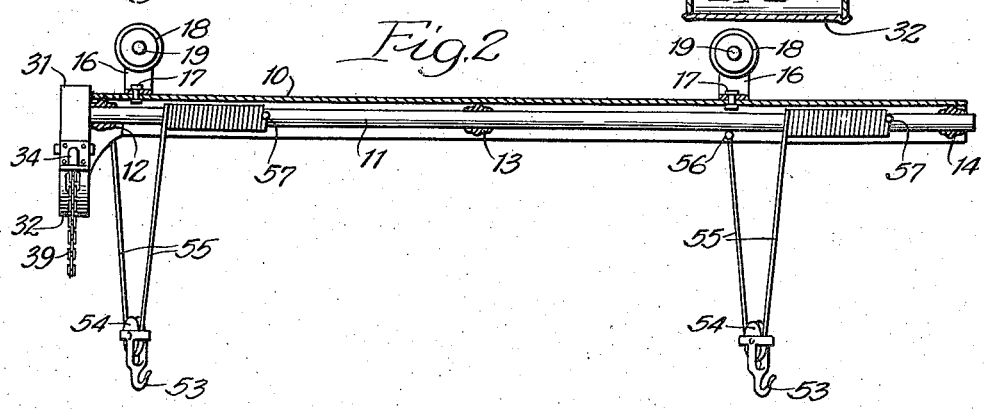

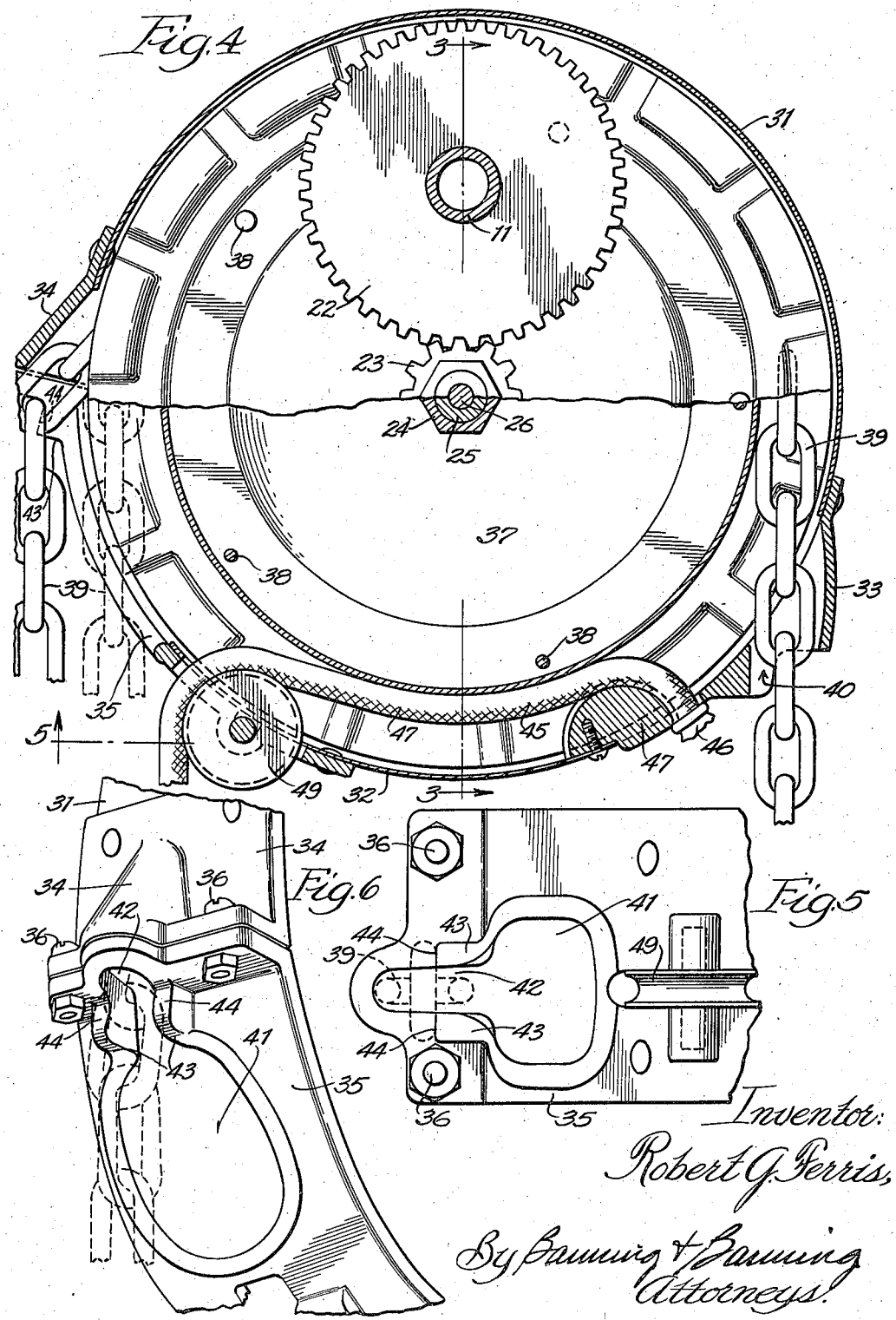

2,144,452

UNITED STATES PATENT OFFICE 2,144,452

LITTER CARRIER

Robert G. Ferris, Harvard, Ill., assignor to Starline, Inc., Harvard, Ill., a corporation of Illinois Application March 19, 1938, Serial No. 196,831

14 Claims. (Cl. 212—135)

An object of this invention is to provide a litter carrier or the like which is more economical of head room than those heretofore built.

Another object is the provision of improved raising and lowering mechanism for litter carriers and the like.

Still another object is to provide an improved means for braking the action of the carrier shaft as the carrier tub descends by gravity.

These and other objects, as will hereinafter appear, are accomplished by this invention which is fully described in the following specification and shown in the accompanying drawings, in which—

Figure 1 is a perspective view of a litter carrier embodying the invention with the carrier raised to its highest position;

Fig. 2 is a longitudinal section through the housing with the carrier removed;

Fig. 3 is a somewhat reduced vertical section on the line 3—3 of Fig. 4;

Fig. 4 is an enlarged section on the broken line 4—4 of Fig. 3;

Fig. 5 is a partial enlarged view as seen on the line 5 of Fig. 4; and

Fig. 6 is a partial perspective view of the chain lock.

The embodiment illustrated comprises a litter carrier having an inverted U-shaped housing or backbone 10 serving as a cover and housing for a hollow carrier shaft 11 which is provided with end bearings 12 and 14 and an intermediate bearing 13 which are mounted in the housing by means of trunnions 15 (Fig. 1) so that these bearings are free to move a limited amount in order to permit them to become adjusted to the various positions of the shaft.

U-shaped truck frames 16 are secured to the upper portion of the housing 10 by means of rivets 17 so as to be rotatable with respect to the housing. Each arm of the member 16 carries a roller 18 rotatable on a short stud 19, the rollers being adapted to run independently on opposite sides of a track 20 which is suspended in a well known manner by means of bolts 21 which are attached to members of the building or to suitable supports. The rollers pass on opposite sides of the bolts.

Referring to Fig. 3, the shaft 11 has a gear 22 secured thereon at one end, this gear meshing with a pinion 23 on a hexagon sleeve 24 which is rotatable on a tube 25. A bolt 26 passes through this sleeve and also through the two disk-like ends 27 and 28.

The disk 28 is firmly welded to the end of the U-shaped housing 10 as well as to a reinforcing angle plate 10ª. A spacer plate 29 is placed between the sleeve 25 and the disk 27 and a spacer plate 30 is placed between the sleeve 25 and the disk 28.

A top housing member 31 (Figs. 3 and 4) overlies the top portion of these disks and is grooved to receive the upper portions of the two disks, thereby spacing them a predetermined distance. A bottom housing member 32 having a similar cross section serves to space the bottom portions of these disks. A casting 33 is riveted to the members 31 and 32 and serves to connect them. A casting 34 (Figs. 4 and 6) is secured to the other end of the top member 31 and a casting 35 is secured by means of rivets to the lower housing member 32. The members 34 and 35 are secured together by means of bolts or the like 36. By loosening these bolts, top and bottom housing members 31 and 32 can be bodily removed from the housing, the disk 27 then being supported from the disk 28 by means of the bolt 26.

The hexagonal sleeve 24 has mounted thereon a chain wheel consisting of similar stamped halves 37 which are secured together by means of rivets 38. This wheel is adapted to receive the alternately crossed links of a chain 39 which runs over the upper portion of the wheel as shown in Fig. 4. An opening 40 is provided in the casting 33. The casting 35 (Fig. 6) is provided with an opening 41 through which the chain may readily pass as long as it assumes the dotted line position of Fig. 4. The upper portion of this opening is narrowed at 42 and provided with abrupt shoulders 43 on each side of the narrowed opening, the portion just beneath the shoulders 43 serving as a block over which the chain may run to act as a friction brake on the chain which is passing up through this opening while the carrier is descending by gravity. This will later be explained in detail. Interengaging notches (not shown) in the disk 28 and projections in the casting 33 serve to prevent rotation of the housing member 32.

Beyond the shoulders 43 are vertical edge portions 44 adapted to receive the chain as shown in Fig. 5 in order to completely lock it.

The upper portion of the opening 41 and the surfaces of 42 and 43 are so formed that while the operator may pull the chain out so as to frictionally engage these surfaces thereby checking the speed of the chain which is passing up through this member, the chain must be brought substantially to rest before a link can be forced over the shoulders 43 into the locking position of Fig. 5.

I have also provided another means for braking the wheel 37. This consists of a flexible brake member 45 the end 46 of which passes through an opening in the casting 33, thence around an arcuate member 47 so as to bring it close to the bottom of an annular groove 48 in the chain wheel. This groove extends completely around the wheel. The flexible brake member 45 then passes over a pulley 49 and is provided with a suitable handle 50 (Fig. 1). It will be noted that the pull of the braking member 45 is such that the pull from the handle 50 will tend to pull this member in the direction that it tends to go when the carrier is descending under its own weight. In that way the result is a snubbing action which tends to apply a great deal more friction to the wheel than the mere pull by operator on the handle 50.

The carrier tub or the like A is pivotally mounted at each end on a U-shaped bail 51 which has eyelets 52 which are adapted to loosely receive a hook of a sheave block 53 in which is rotatably mounted a sheave 54. A light chain 55 is connected at 56 to the U-shaped housing 10 while the other end of the chain is connected at 57 to the shaft 11 so that as the shaft rotates, it is wound about the same as shown thereby lifting the carrier tub. The looseness between the hook 53 and the eyelet 52 permits the sheave 54 to adjust itself to the varying positions of the chain 55 which are incident to different elevations of the carrier tub.

Thus, it will be seen that a very simple and efficient form of litter carrier is provided. This carrier also has the advantage of an exceptionally high lift with respect to the track owing to the arangement of trucks and the U-shaped housing 10 within which is placed the carrier shaft. The center of the chain wheel also being well below the center of the carrier shaft further permits raising of this shaft with respect to the carrier track.

The swinging of the sheave 54 also permits the bail of the carrier to be brought up near the carrier shaft 11 further economizing on the matter of head room.

I claim:

1. In a carrier of the class described, an inverted U-shaped housing, trucks pivotally mounted above the housing and having wheels adapted to run on a track, a carrier shaft extending substantially through the housing and journaled therein at at least three points, a carrier bail and tub, means for suspending the carrier bail on the shaft, and means for rotating the shaft for raising and lowering the carrier bail and tub.

2. In a carrier of the class described, an inverted U-shaped housing, trucks pivotally mounted above the housing and having wheels adapted to run on a track, a carrier shaft extending substantially through the housing and journaled therein at at least three points to form an intermediate bearing and two end bearings, a carrier bail and tub, means for suspending the carrier bail on the shaft including flexible members secured at one end to the shaft so as to be wound thereon one flexible member being secured to the shaft between the intermediate bearing and an end bearing, the other flexible member being secured to the shaft between the intermediate bearing and the other end bearing, and means for rotating the shaft for raising and lowering the carrier bail and tub.

3. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft including flexible members secured at one end to the shaft so as to be wound thereon with a sheave over which each flexible member passes, each sheave block being pivotally connected to the carrier bail and tub so as to turn with respect thereto as the carrier bail and tub are raised and lowered, and means for rotating the shaft for raising and lowering the carrier bail and tub.

4. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft, a gear secured on the end of the shaft, a pinion lying beneath the gear and meshing therewith, a chain wheel mounted to rotate with the pinion, a casing enclosing the chain wheel, gear and pinion and secured to the end of the housing, and means for rotating the chain wheel to raise and lower the carrier bail and tub.

5. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft, a gear secured on the end of the shaft, a frame secured to the end of the housing, a drive shaft journaled in the frame, a pinion secured on the drive shaft and meshing with the gear beneath the latter, a chain wheel secured on the drive shaft, and means on the frame for locking the chain in adjusted positions.

6. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft, a gear secured on the end of the shaft, a frame secured to the end of the housing, a drive shaft journaled in the frame, a pinion secured on the drive shaft and meshing with the gear beneath the latter, a chain wheel secured on the drive shaft, and means on the frame for frictionally engaging the chain while in motion to serve as a brake on the same.

7. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft, a gear secured on the end of the shaft, a frame secured to the end of the housing, a drive shaft journaled in the frame, a pinion secured on the drive shaft and meshing with the gear beneath the latter, a chain wheel secured on the drive shaft, and a flexible braking member passing over a portion of the chain wheel having one end secured to the frame and the other extending to a position near the operator where it can be pulled to apply a braking action.

8. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft, a gear secured on the end of the shaft, a frame secured to the end of the housing, a drive shaft journaled in the frame, a pinion secured on the drive shaft and meshing with the gear beneath the latter, a chain wheel secured on the drive shaft, the chain wheel having an annular groove, and a flexible braking member adapted to engage said groove to apply a braking action.

9. In a carrier of the class described, a carrier, means for raising and lowering the same including a chain wheel and a chain running over the chain wheel, a casing enclosing the chain wheel, and having an opening therein through which the chain passes, the lips of the opening being so formed as to permit the chain to be locked therein while the chain is moving slowly and to act as a brake on the chain but to prevent it from being suddenly locked when the chain is moving rapidly.

10. In a carrier of the class described, a carrier, means for raising and lowering the same including a chain wheel and a chain running over the chain wheel, a casing enclosing the chain wheel, and having an opening therein through which the chain passes, the opening having a lower inner part through which the chain passes freely and an upper portion comprising two lips spaced sufficiently to permit links to pass in one plane but engaging links at right angles thereto to permit the chain to be locked therein while the chain is moving slowly and to act as a brake on the chain but to prevent it from being suddenly locked when the chain is moving rapidly.

11. In a carrier of the class described, an inverted U-shaped housing, trucks pivotally mounted above the housing and having wheels adapted to run on a track, a carrier shaft journaled in the housing at at least three points, a carrier bail and tub, means for suspending the carrier bail on the shaft, a gear on the end of the shaft, a pinion below the gear, and meshing therewith, a chain wheel driving the pinion, and a casing surrounding the gears, the top of the casing extending but little above the top of the housing.

12. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft, a gear on the end of the shaft, a pinion below the gear, and meshing therewith, a chain wheel driving the pinion, and a casing surrounding the gears, the top of the casing extending but little above the top of the housing, the casing comprising spaced disks, one of which is secured to the end of the housing, and casing members having grooves enclosing the edges of said disks.

13. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft including flexible members secured at one end to the shaft so as to be wound thereon, and means for rotating the shaft for raising and lowering the carrier bail and tub, the housing and shaft extending beyond the supporting wheels at one end, the flexible members winding on the shaft in the same direction at both ends.

14. In a carrier of the class described, an inverted U-shaped housing, trucks pivotally mounted above the housing and having wheels adapted to run on a track, a carrier shaft extending substantially through the housing and journaled therein, a carrier bail and tub, means for suspending the carrier bail on the shaft including flexible members secured at one end to the shaft so as to be wound thereon, and means for rotating the shaft for raising and lowering the carrier bail and tub, the housing and shaft extending beyond the supporting wheels at one end, the flexible members winding on the shaft in the same direction at both ends, the shaft being journaled in the housing at its ends and near its center.

ROBERT G. FERRIS.